Patented June 30, 1936

2,046,056

UNITED STATES PATENT OFFICE 2,046,056

ELECTRICAL CURRENT CONDUCTOR

Edmund W. Bremer, Weehawken, N. J.

No Drawing. Application May 16, 1934,
Serial No. 725,954

1 Claim. (Cl. 75—173)

The present kinds of materials used for electrical conductors, electrical pressure contacts and electrical wear resistance bodies, consisting of copper, silver and similar metals, do not fully possess desired characteristics for all of said objects, and wear out and deform rapidly when so utilized, thereby requiring continuous repair and replacement.

The present invention is for the formation of the aforementioned objects from a ternary alloy of which beryllium is one essential component in the proportions of about ½ of 1% to 3% by weight, with a small percentage not exceeding ½ of 1% of chromium by weight, with silver forming the remainder. Either before or after said alloy has been formed into said electrical current conductors, it may, if preferred, be hardened by heat treatment or age hardening.

My invention is illustrated by utilizing small segments of this alloy inserted in the shaft and/or bearing of electrical resistance seam welding machinery, or the shaft or bearing of said machinery faced with this alloy, thereby greatly reducing the wear and deformation of said shaft or bearing, resulting from pressure, heat or friction, said alloy readily permitting passage of electrical currents through the moving parts. Said illustration is intended as descriptive only, and not restrictive of the use or application of this invention.

In my prior application for Letters Patent, Serial Number 702,318, of December 14, 1933, I described an alloy of which beryllium is the essential component, for use specially as resistance welding dies and electrodes.

Having described my invention, what I claim as new and desire to secure by Letters Patent is:—

Electrical current conductors formed from a ternary alloy whereof beryllium is one of the essential components in the proportions of about ½ of 1% to 3% by weight with a small percentage, not exceeding ½ of 1% of chromium by weight, the balance being silver.

EDMUND W. BREMER.